Nov. 11, 1941. P. H. IRMISCHER 2,262,585
SWIVEL JOINT
Filed July 10, 1941
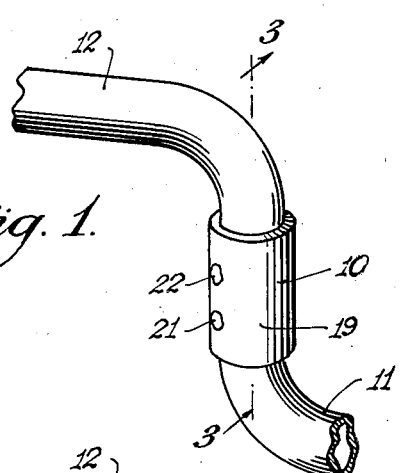
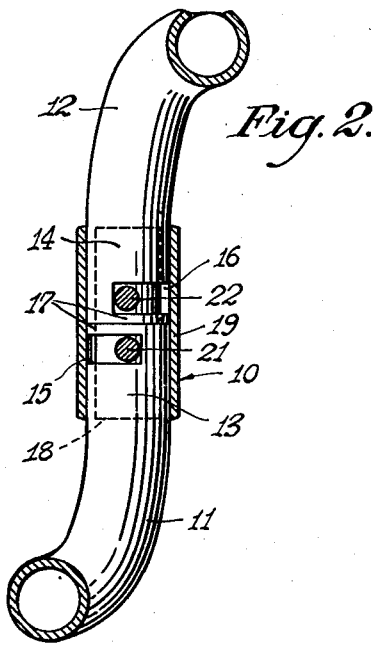
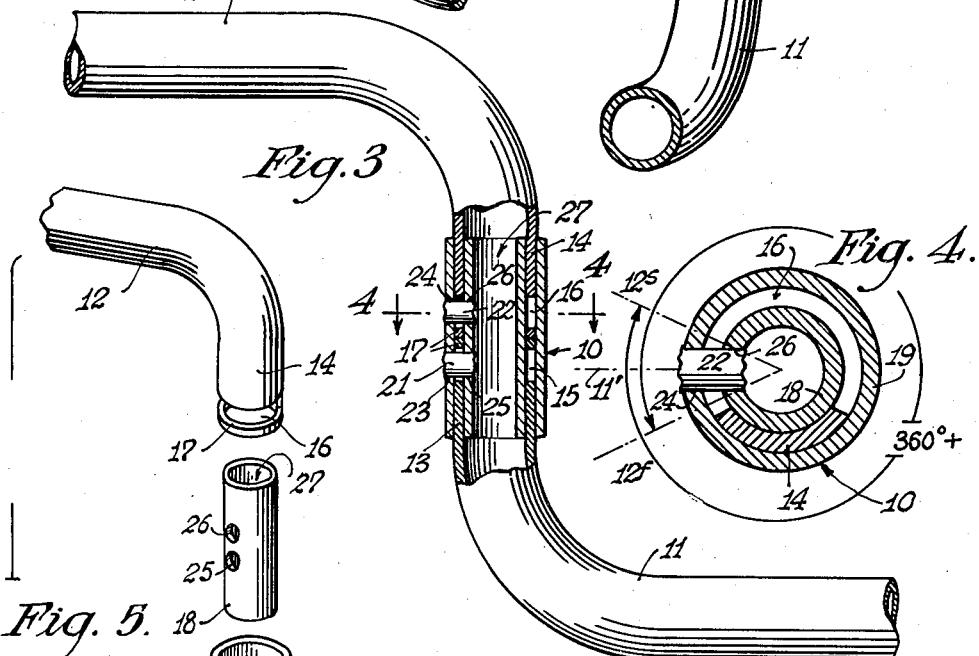
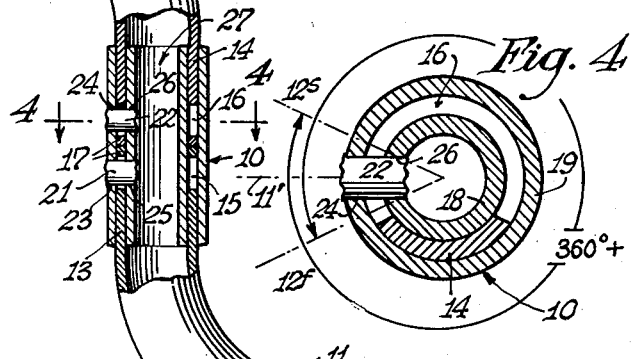
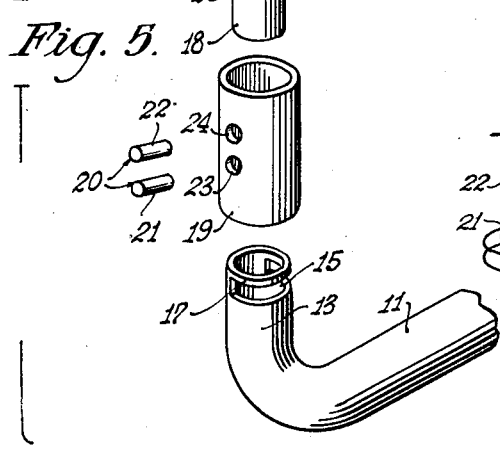
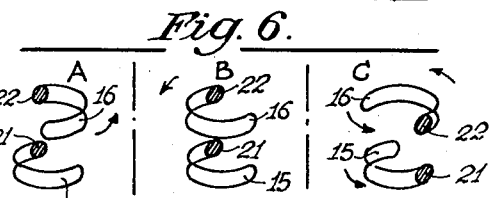
Paul H. Irmischer
INVENTOR.
BY Clarence E. Threedy
HIS ATTORNEY Patented Nov. 11, 1941

2,262,585

UNITED STATES PATENT OFFICE 2,262,585

SWIVEL JOINT

Paul H. Irmischer, Chicago, Ill.

Application July 10, 1941, Serial No. 401,729

4 Claims. (Cl. 285—97.3)

This invention relates to swivel joints for conduit members and has for its principal object the provision of an improved interlocking means which is simple in construction, efficient in use and highly economical in manufacture.

Another object of the present invention is the provision of improved construction whereby to limit the rotative movement of a pair of interlocked conduit members to prevent injury to the electric wiring adapted to pass through said conduit members.

A further object of the present invention is to provide in a swivel joint for lamp brackets a simple stop means which will permit the bracket elements to rotate more than one complete revolution with respect to each other thus giving such lamp bracket a wide range of adjustability.

Other objects and advantages of the present invention reside in certain details of construction to be described hereafter in view of the drawing in which Fig. 1 is a perspective view of a swivel joint interposed between two swinging brackets;

Fig. 2 is an enlarged elevational view of the swinging brackets of Fig. 1, in a different position, with a portion of the swivel housing broken away to disclose the abutting ends of the swivel brackets;

Fig. 3 is a vertical sectional detail through the swivel joint of Fig. 1 and is taken substantially along line 3—3 of Fig. 1;

Fig. 4 is an enlarged horizontal sectional view taken through the swivel joint, looking down along line 4—4 in Fig. 3;

Fig. 5 is an exploded perspective view of the device illustrated in Fig. 1 with its several parts in disassembled relation, preparatory to assembly; and Fig. 6 is a diagram explaining the principal steps in the rotation of the two bracket members with respect to each other.

In the present instance, my improved swivel joint, generally indicated at 10, is shown associated with a bracket element 11 usually fixed to some stationary point, and a bracket member 12 to support a lamp assembly and adapted to rotate with respect to the bracket 11. The bracket members 11 and 12 are tubular members and each have a portion elbowed to dispose an end portion 13 and 14 respectively in a vertical position. Each of the end portions 13 and 14 has a slot 15 and 16 respectively formed therein. This slot in each of the members 11 and 12 is of a length substantially greater than one-half the circumference of the tubular member and is formed at a point substantially adjacent the open end of the vertical portion of the bracket so as to provide a portion of tubing 17 at the open end portion of the brackets.

There is provided an inner sleeve member 18 which has an outer diameter that will fit snugly into the open end portions of the two vertically disposed ends 13 and 14 of the bracket members 11 and 12. The portions 13 and 14 are thus maintained in vertical axial alignment with respect to each other by this inner sleeve 18. The open end of each of the portions 13 and 14 are disposed in abutting relation with respect to each other, it being understood that some friction reducing element might be disposed between these abutting ends. The abutting ends of the portions 13 and 14 are inclosed within the outer sleeve housing 19, which outer housing is preferably a tubular member adapted to fit snugly over the outer diameter of the tubular elements 11 and 12. The inner sleeve 18 and the outer housing 19 are substantially the same length and are vertically disposed in the same horizontal plane, thus forming a rigid support for the abutting ends of the two brackets 11 and 12.

To complete the assembly the two abutting ends of the brackets 11 and 12 are movably joined to the inner and outer swivel members 18 and 19 by a pair of stud members 20. One of the stud members 21 has its end portions supported in aligned openings 23, 25 formed in the outer sleeve 19 and the inner sleeve 18 respectively. These aligned openings 23, 25 are in axial alignment with the axis of the slot 15 in the lower bracket 11 thereby disposing the medial portion of the stud 21 in the slot 15 for movement with respect thereto.

The upper stud member 22 is likewise supported by the outer and inner sleeve members 19 and 18 in a pair of aligned openings 24, 26 respectively formed in each of these sleeves 19 and 18. The axis of the upper stud is in a horizontal plane aligned with the axis of the elongated slot 16 in the upper bracket member 12, thus permitting the stud 22 to move with respect to the bracket 12. As will be seen in Fig. 3, the swivel joint provides an inner passage 27 through the inner sleeve member 18 such that electric wiring may pass through the lower bracket 11 to the upper, movable, bracket 12. By the present arrangement, the upper bracket member may be rotated with respect to the lower member 11 by merely swinging the upper bracket 12 at the swivel joint 10. The range of swing provided by this present disclosure is in excess of 360°. As seen in Fig. 4, the dot dash line 11' indicates the axis of the fixed bracket 11, 12$^s$ indicates the axis of the movable bracket 12 at the start of the swinging movement, movement being in a counter-clockwise direction until the axis of the upper bracket 12 assumes a plane along the dot dash line indicated at 12$^f$.

To explain the action of the upper member 12 with respect to the lower member 11 in Fig. 6 there is diagrammatically shown the three principal steps in the course of one complete revolution, as shown in Fig. 4. In Fig. 6 step A indicates the position of the upper and lower slots 16—15 and the stud members 21—22 associated therewith. The position of the parts as illustrated in step A being complementary to the position of the parts when the upper bracket member 12 is disposed along the dot dash line 12$^s$ as shown in Fig. 4. When the bracket 12 is rotated counter-clockwise the pins 21—22 remain stationary, the slot 16 of the bracket 12 permitting such rotative movement. After the bracket 12 has rotated substantially beyond 180° the trailing end of the slot 16 will engage the upper stud 22 which is the next principal step as indicated at B (Fig. 6). The upper bracket 12 continues in its counter-clockwise rotation and by reason of the engagement of the trailing end of the slot 16 with the stud 22, the stud 22 will be urged in a counter-clockwise direction and by reason of its connection with the inner and outer sleeve members 18—19 such sleeve members will rotate as a unit with the upper bracket 12. The rotative movement of the inner and outer sleeves 18—19 will cause a like rotative movement of the lower stud pin 21 which is normally positioned in one extreme end of the slot 15 as shown, through the slot formation 15 in the lower bracket 11 until the lowermost stud 21 abuts the opposite end of the slot 15 as indicated in the diagram (Fig. 6) at C. The position of the movable bracket 12 will then be in a plane substantially along line 12$^f$ as shown in Fig. 4.

By the present invention I have provided an improved swivel joint structure wherein relatively inexpensive tubular bracket members are joined for rotative movement with respect to each other by a simple arrangement of tubular sleeves. The means for fixing the two movable brackets with respect to each other at the same time is employed as a stopping means that limits the rotative movement of the two brackets with respect to each other thus eliminating the number of parts as well as difficulty of assembly.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In a swivel joint, a pair of tubular bracket members and means joining the same in assembled relation for relative turning movement, said means comprising the provision of an inner tubular sleeve adapted to be received in the open ends of said bracket members to maintain the same in axial alignment with each other, an elongated slot formation in each of said bracket members adjacent the open ends thereof and extending circumferentially of said members, a distance substantially greater than 180°, a tubular housing encasing said bracket members in the region of said open ends, means for interlocking said bracket members with said inner tubular sleeve and said tubular housing, said means comprising a pin element for each of said slot formations and having its medial portion disposed therein and its end portions fixedly supported on the inner tubular sleeve and the tubular housing.

2. In a swivel joint assembly an outer sleeve and an inner sleeve, a pair of rotatable bracket members having their open end portions disposed between said outer sleeve and said inner sleeve in co-axial relation with respect to each other, each of said bracket members having an annular slot formed circumferentially therein adjacent the open end portion thereof, and a pair of stop means supported by said inner and outer sleeve, one of said stop means having its medial portion disposed through the slot formation in one of said brackets, the other stop means having its medial portion disposed through the slot formation of the other one of said bracket members.

3. In a swivel joint assembly an outer sleeve and an inner sleeve, a pair of rotatable bracket members having their open end portions disposed between said outer sleeve and said inner sleeve in co-axial relation with respect to each other, each of said bracket members having an annular slot formed circumferentially therein adjacent the open end portion thereof, stop means on said outer sleeve and including a portion extending from the outer sleeve into each of the slot formations in the bracket members.

4. In a swivel joint assembly an outer sleeve and an inner sleeve, a pair of rotatable bracket members having their open end portions disposed between said outer sleeve and said inner sleeve in co-axial relation with respect to each other, each of said bracket members having an annular slot formed circumferentially therein adjacent the open end portion thereof, and a pair of stop means formed in said outer sleeve, one of said stop means having a portion thereof disposed through the slot formation in one of said brackets, the other stop means having a portion thereof disposed in the slot formation of the other one of said bracket members.

PAUL H. IRMISCHER.